July 1, 1941.   H. DE MARTIS ET AL   2,247,992
ELECTRODE OF SECONDARY BATTERIES
Filed Jan. 18, 1939
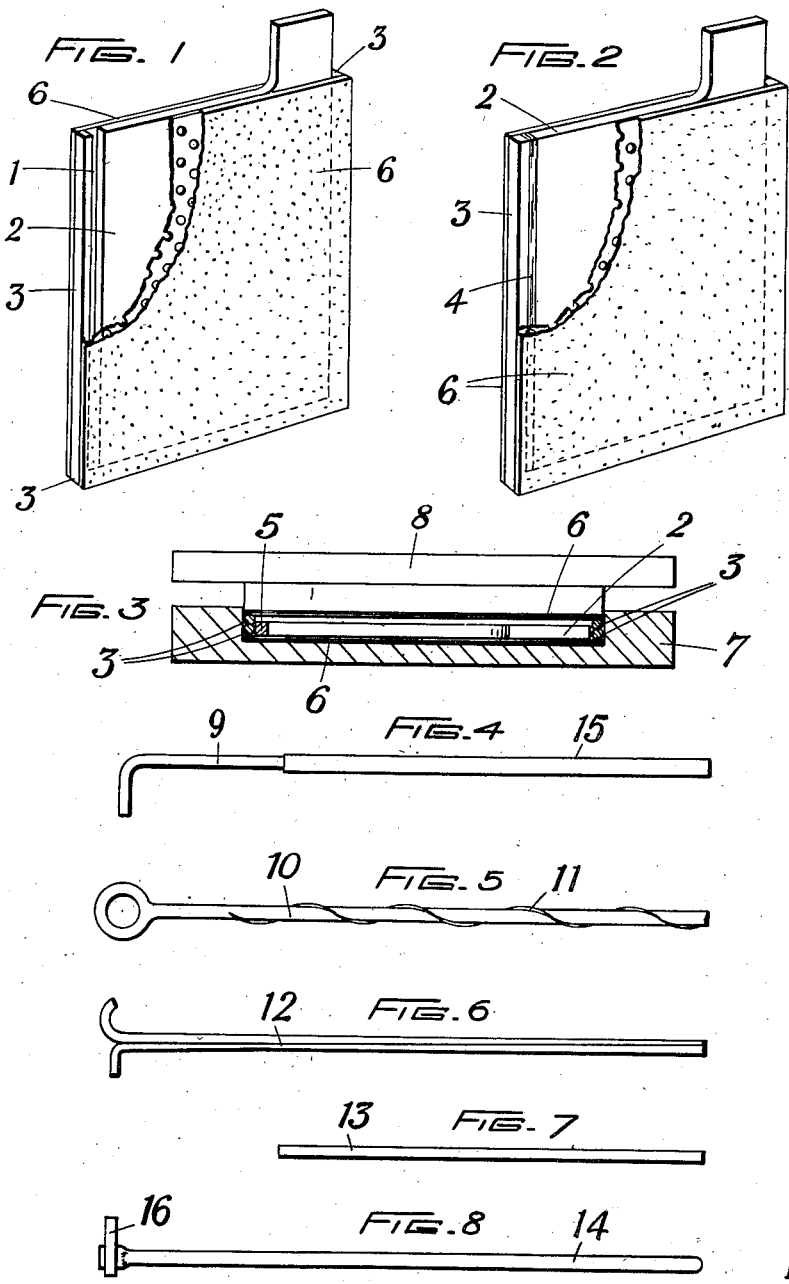
Inventor
Horace De Martis
Sydney J. Clark
by
Attorney Patented July 1, 1941

2,247,992

UNITED STATES PATENT OFFICE 2,247,992

ELECTRODE OF SECONDARY BATTERIES

Horace De Martis and Sydney James Clark, New Malden, England

Application January 18, 1939, Serial No. 251,604
In Great Britain January 18, 1938

5 Claims. (Cl. 136—63)

This invention has reference to the manufacture of units for use in secondary batteries and to secondary battery units, the units comprising an electrode in an envelope formed by two sheets of suitable material spaced apart and united at suitable marginal portions by soft rubber or other suitable plastic material between the said marginal portions, the electrode being used as the former for the envelope.

The present invention consists in providing an expansion space or expansion spaces between one or more edges of the electrode and the soft rubber or the like adjacent thereto. The space or spaces are provided by locating a removable, collapsible or soluble spacing body between the or each edge and the soft rubber or the like at the time of effecting the union of the said sheets with the rubber or the like.

The present invention is advantageously employed in conjunction with the invention set forth in Patent No. 2,047,179. We have found that during the service of the electrode, particularly where there is much over-charging, the outward forces produced owing to the growth of the electrode have a tendency in extreme cases, where the elastic limit of the soft rubber has been exceeded, to cause the soft rubber partly to break away from the edges of the sheets and especially to reduce the cushioning effect of the soft rubber. Thus, when the present invention is applied to that set forth in Patent No. 2,047,179 the expansion space or spaces accommodate the growth of the electrodes so that the useful life of an already long-life battery unit is increased.

The present invention will now be described with reference to the examples illustrated in the accompanying drawing wherein:

Fig. 1 is a perspective view of a battery unit constructed according to Patent No. 2,047,179 and improved in accordance with the present invention;

Fig. 2 is a perspective view of a like unit;

Fig. 3 is an end elevation, partly in section, of a mould used in connection with the present invention;

Figs. 4 to 8 show various spacing bodies.

The units in Figs. 1 and 2 each comprise the electrode 2 in an envelope formed around the electrode by placing ebonite sheets 6, 6 of larger size than the body of the electrode at opposite faces thereof and uniting the side and bottom margins of the sheets by soft rubber or the like 3. Each sheet 6 comprises a layer of porous ebonite conjoined by vulcanization to a layer of perforated ebonite.

In manufacturing the unit according to the invention a composite sheet 6 is placed in the bottom of a matrix 7, the electrode 2 of smaller size than the said sheet 6 is placed on the sheet and the spacing body 5 is laid along one side edge of the electrode. Soft rubber strip 3 is then forced into the spaces between the body 5 and the adjacent side of the matrix, the bottom of the electrode and the adjacent side of the matrix and the remaining side edge of the electrode and the matrix. The second composite sheet 6 of substantially the same size as the first is then placed in the matrix. The cover 8 is placed in position and the whole subjected to heat and pressure to cause the strips 3 to unite together and with the marginal portions of the sheets 6. The unit is then removed from the mould. This method of manufacture and the unit produced are substantially in accordance with the method and the unit set forth in Patent No. 2,047,179, the primary difference being the use, in the present case, of the spacing body.

The spacing body may comprise a square section rod 9, Fig. 4, a rod 10, Fig. 5, with a steep screw thread 11 on it, a rod 16, Fig. 6, a rod 13, Fig. 7, or a rubber tube 14, Fig. 8.

If rods as 9, 10 or 12 are used they are withdrawn from the unit while it is hot to provide the space as 1 (Fig. 1).

The rod 9 is the spacing body preferably used and is preferably covered with lead foil 15 to facilitate its withdrawal. The foil consists of good battery lead as it remains in the unit. Instead of using a foil sheath we may use a cotton sheath e. g., braided cotton as used on electric flex. The rod may be lubricated with graphite, french chalk or the like to facilitate its withdrawal and when lubricant is used it is not essential to employ a sheath.

The steep screw thread 11 on the rod 10 enables the rod to be withdrawn from a unit by a simultaneous turning and pulling action.

The rod 12 consists of two mating wedges the upper one of which is withdrawn first.

The rod 13 comprises material soluble in the electrolyte in which the unit is destined to be immersed. A suitable material is made of salts such as anhydrous sulphates with or without a carbo-hydrate binder, for example 90% anhydrous sodium sulphate and 10% cane sugar. These percentages can be widely varied to suit moulding or extrusion.

If the spacing body 14, which consists of an inflated or distended rubber tube permanently closed at one end and closed at its other end by a clip 16, is used the rubber is trimmed off after the moulding operation and this allows the material in the tube to escape so that the tube can collapse as the electrode grows.

If desired, a space as 1, or a spacing body as 4, may be located at the remaining side edge of the electrode by the appropriate use of a rod or the like at this side. Furthermore a space as 1, or a spacing body as 4, may be located at the bottom edge of the electrode. In the latter case when a withdrawable rod is used to provide the space the hole in a bottom corner of the envelope through which the rod passes is plugged subsequently to the withdrawal.

What we claim is:

1. In a method of manufacturing a secondary battery unit wherein an electrode is held in an envelope having rigid sides and soft rubber edges, consisting in locating a spacing body against an edge of said electrode and locating said electrode and said body between said sides, each side having a greater superficial area than the total superficial area of the electrode and the spacing body whereby overhanging marginal portions are provided adjacent the edges of the electrode, locating soft rubber strips between said overhanging portions, subjecting the assembled parts to vulcanizing heat and to pressure, with the heat vulcanizing said soft rubber strips, and finally effecting removal of said spacing body.

2. In the method of manufacturing a secondary battery unit wherein an electrode is held in an envelope having rigid vulcanized sides and soft rubber edges, the steps of assembling the electrode and sides, placing a removable spacing body—soluble in battery electrolyte—against one of the side and bottom edges of the electrode, inserting soft rubber strips between the edges of the vulcanized sides, subjecting the assembled parts to vulcanizing heat and pressure, and effecting removal of the strip by subjecting the unit to the action of battery electrolyte.

3. In the method of manufacturing a secondary battery unit wherein an electrode is held in an envelope having rigid vulcanized sides and soft rubber edges, the steps of assembling the electrode and sides, placing a normally expanded and collapsibly removable spacing body against one of the side and bottom edges of the electrode, inserting soft rubber strips between the edges of the vulcanized sides, subjecting the assembled parts to vulcanizing heat and pressure, and effecting removal of the strip by collapsing the strip and exerting traction thereon.

4. A secondary battery unit comprising an electrode in an envelope formed by two sheets of suitable material spaced apart and united at marginal portions by soft rubber between the said marginal portions, characterised in that an expansion space or expansion spaces is or are provided between one or more edges of the electrode and the soft rubber adjacent thereto by means of a spacing body or bodies lying in the said space or spaces between the envelope and the electrode, said body being removable.

5. A secondary battery unit comprising an electrode in an envelope formed by two sheets of suitable material spaced apart and united at marginal portions by soft rubber or the like between the said marginal portions, characterised in that a spacing body soluble in the electrolyte of the battery wherein the unit is used is located between an edge of the electrode and the soft rubber wherein to provide, when dissolved, an expansion space or expansion spaces for the electrode.

HORACE DE MARTIS.
SYDNEY JAMES CLARK.